Sept. 9, 1969  R. P. DIXON  3,465,818
UNDERCUTTING OF NUCLEARLY DETONATED FORMATIONS BY
SUBSEQUENT NUCLEAR DETONATIONS AT GREATER
DEPTH AND USES THEREOF IN THE
RECOVERY OF VARIOUS MINERALS
Filed Nov. 7, 1967
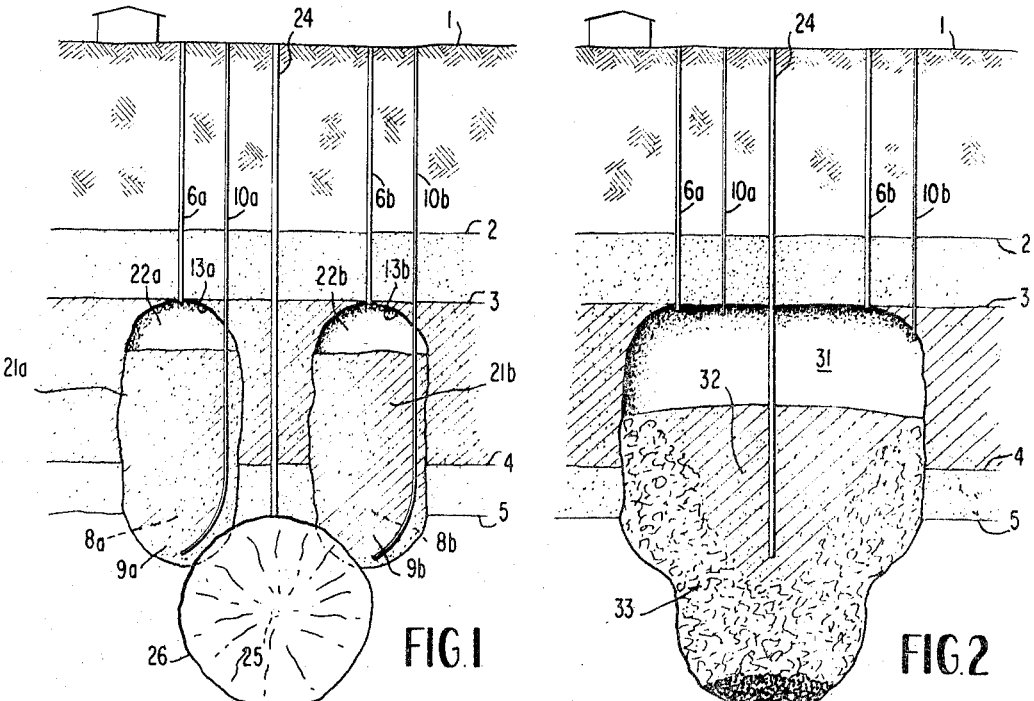
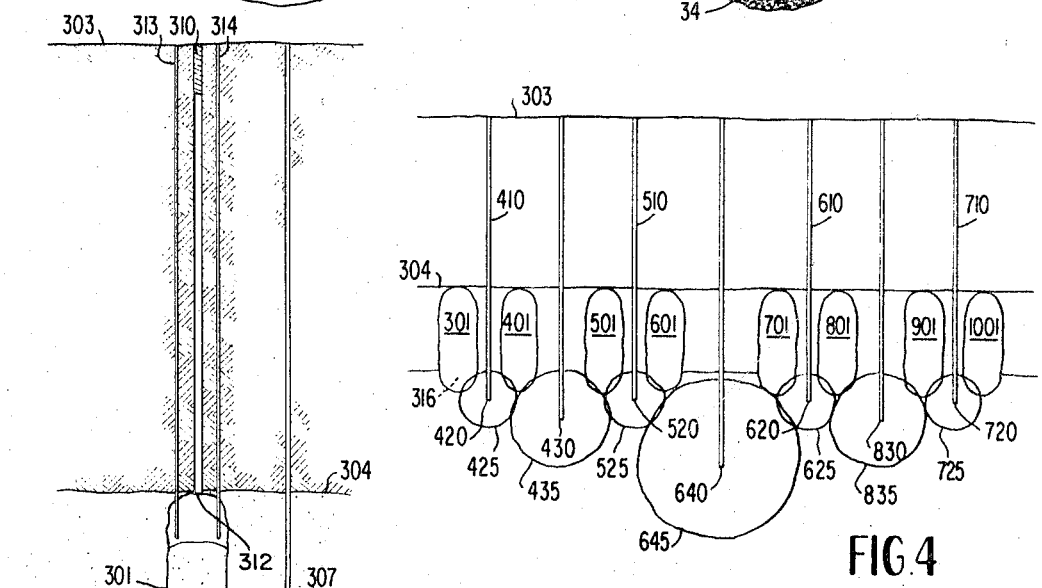
INVENTOR
ROD P. DIXON

United States Patent Office 3,465,818
Patented Sept. 9, 1969

3,465,818
UNDERCUTTING OF NUCLEARLY DETONATED FORMATIONS BY SUBSEQUENT NUCLEAR DETONATIONS AT GREATER DEPTH AND USES THEREOF IN THE RECOVERY OF VARIOUS MINERALS
Rod P. Dixon, Salt Lake City, Utah, assignor to American Oil Shale Corporation, Salt Lake City, Utah, a corporation of Utah
Continuation-in-part of applications Ser. No. 541,810, Apr. 11, 1966; Ser. No. 547,672, May 4, 1966; Ser. No. 615,444, Feb. 13, 1967. This application Nov. 7, 1967, Ser. No. 681,146
Int. Cl. E21b 43/26, 43/24
U.S. Cl. 166—247    16 Claims

ABSTRACT OF THE DISCLOSURE

By detonating a large size nuclear device below a column of broken mineral rubble created by an earlier nuclear detonation, the rubble is crushed to a fined average particle size while the overall permeability of the broken formation is increased as the column of broken material settles into the cavity created by the subsequent nuclear detonation. When using this technique in an oil shale formation, a hot retort gas may be passed through the broken formation either before or after, or both before and after, the second detonation to distill hydrocarbons from the detonated formation. In metal ore formations an extractive liquid solvent or a liquid flotation medium may be injected into the formation between the two consecutive detonations whereby the second detonation forces the injected treating liquid upwardly through the broken formation, increases the permeability of the latter, and facilitates in situ extraction or flotation.

---

This applicaiton is a continuation-in-part of copending applications Ser. No. 541,810, filed Apr. 11, 1966; Ser. No. 547,672, filed May 4, 1966, now U.S. Patent 3,404,-919, and Ser. No. 615,444, filed Feb. 13, 1967.

BACKGROUND OF INVENTION

When a nuclear device is detonated underground, thermal energy at the point of detonation is released in the millions of degrees centigrade range and a high energy shock wave is created. At first the liberated heat vaporizes the formation in the vicinity of the detonation and thereafter the shock wave melts the formation outward from the hot central cavity containing the vaporized formation. When the melted zone is formed the shock wave moves out further compressing and crushing the formation so long as its energy exceeds the compressive strength of the formation. When radial compression of the formation ceases being sufficient to cause continued radial expansion of the hot vapor-containing cavity the latter then grows and expands predominantly upward so long as its energy exceeds the lithostatic pressure of the overburden. The melted formation flattens and to some extent runs down upon the internal wall of the cavity and a small sintered zone develops. The shock wave degenerates into a seismic wave which the fractures the formation, except in certain plastic formations such as rock salt. Because of internal reactions and escape of gas and energy through cracks and fissures the roof of the cavity collapses and the collapse of progressively higher strata follows until a substantially cylindrical underground column of rubble with gas therebetween and a gas filled cavity at the top thereof is formed above the site of the initial cavity. For instance, such gas may be hydrogen or light hydrocarbons produced by pyrolysis of heavier hydrocarbons originally present in the formation, or it may be carbon dioxide formed by decomposition of limestone, etc.

When this kind of detonation is used for the underground breaking of a geological formation, whether singularly or particularly in upward or lateral sequence, the resulting broken formation is more or less compacted and this makes in situ treatment of such a formation with treating fluids as well as the ultimated recovery of fluid products therefrom relatively difficult. While the use of multiple detonations has the advantage of permitting treatment of a formation to a greater extent and introducing into it more energy for product distillation or similar purposes than is possible by a single detonation, multiple upward or lateral detonations tend to aggravate the problem of reduced permeability due to compaction. Furthermore, the size of nuclear explosives useable in an upward or lateral series of detonations is necessarily limited because the closer to the earth surface a nuclear device is emplaced the smaller it must generally be in yield if objectionable venting of radioactive debris into the atmosphere is to be prevented.

SUMMARY OF INVENTION

According to the present invention a special sequence of underground detonations is employed so as to provide an improved process for removing mineral values in situ, with or without the use of auxiliary treating fluid such as retorting gas, extractive solvent or other medium favoring selective recovery.

BRIEF DESCRIPTION OF DRAWINGS

FIG. 1 is a vertical section through a geological formation showing two underground columns 21a and 21b of nuclearly detonated rubble spaced laterally apart from each other and an undercutting cavity 26 being created therebewteen at a lower level by a further nuclear detonation;

FIG. 2 is a vertical section through the formation shown in FIG. 1 after collapse of the undercutting cavity and its filling by the broken material from columns 21a and 21b and from the formation therebetween;

FIG. 3 is a vertical formation through a geological formation showing an underground column 301 of nuclearly detonated rubble similar to columns 21a or 21b of FIG. 1 but containing a pool of added treating liquid having an upper surface 315 in the lower part of column 301, and an undercutting cavity 306 being created directly therebelow by detonation of a nuclear device placed there through slanted access well 307;

FIG. 4 is a vertical section through a geological formation schematically showing an advantageous arrangement wherein nuclear explosive devices of increasing explosive devices of increaseing explosive yield are used at several progressively deeper levels in the formation.

General description

The recovery of mineral values in situ without the attendant mining of waste material offers important economic advantages over the conventional kind of mining wherein minerals are mined underground and brought to the surface for processing into desired products. In conventional mining operations access to an underground formation is secured by shaft or tunnel and the desired mineral zone is mined out. In their natural state minerals commonly have permeability in the darcy or millidarcy range but upon being mined a stack of mineral rock will have permeability of the order of 25 volume percent.

Upon being mined the rock is taken to the surface and run through a crusher which further reduces its size and makes the size more uniform to facilitate further processing. In many instances the crushed rock is further reduced in size by running it through a ball mill. For instance, in the recovery of copper oxide the finely ground ore is treated with sulfuric acid or other appropriate solvent and the copper is thus recovered in the form of a pregnant solution. Where heat is a necessary ingredient for recovery, as in oil shale retorting, it may be furnished wholly by exterior means or partly from the oil shale itself, e.g., by combustion of the carbonaceous residue remaining after distillation of its more volatile components.

A series of nuclear explosive devices detonated underground in a proper sequence and mutual relationship can produce essentially the same results and give essentially the same products as conventional mining, crushing, treatment with an extractive fluid and product recovery therefrom. The initial creation of a cavity by detonation of a nuclear device is the equivalent of creating a shaft or tunnel in a formation so that material may be mined or broken into it or moved to secure greater permeability. When the cavity created by vaporizing the formation then expands it causes explosive fracturing of the formation, analogous to the use of conventional explosives in mining. Finally, when the roof of the cavity collapses, the effect is the same as a face of ore dropping into the end of a tunnel or the bottom of a shaft. The cylinder or column of broken material thus created by a nuclear detonation is much like a vat or tank in an ore treatment plant.

In a process where only solvents or other chemicals are needed for treatment they are added at this point in a conventional process. By mechanical and other agitation to improve contact, a pregnant solution is obtained as the desired mineral values are dissolved by the solvent. Correspondingly, in the present invention an appropriate treating fluid may be introduced into the permeable column of broken rubble at this stage.

For instance, in the case of metal ore treatment, a second device is then placed underneath the column of broken rubble at a point where the melted zone created by detonation of the second device will be far enough below the solvent that the heat liberated in the second detonation will not be able to propagate sufficiently to where it would produce an adverse effect such as excessive evaporation of previously added aqueous sulfuric acid.

When the cavity produced by such a further detonation expands, it will do so principally towards the prior broken zone or column of rubble thereabove. As the shock wave from the second detonation reaches the broken zone above it, it will set up an advancing crushing front which will reduce the broken formation through which it passes to a desirable particle size and additionally will push the injected solvent upwardly ahead of it.

As the solvent advances ahead of the crushing front it will be pushed into and around rock from which minerals are to be recovered. Channeling and consequent uneven treatment will be at a minimum because of the increased degree of equality of particle size in the mass and because gravity will pull back down any solvent that rises up through any channels ahead of the main front being treated. As the crushing front crushes and compacts the previously broken rock in the cylinder, the solvent placed therein will be thrust upward by the pressure of the crushing front. This will effectively push the solvent up into all or substantially all the portion of the cylinder within which the broken rock is contained, extracting metal therefrom along the way. Additionally, the pressure will force some of the solvent into the fractures or fissures running from the cylinder and thus extract minerals from such further parts of the formation. After the crushing front has passed upwardly through the cylinder, the solvent thus lifted to the top and now containing some metal in solution will percolate back down through the broken and crushed ore, extracting additional metal along the way and finally collecting as a pregnant solution at the bottom of the cylinder whence it can be pumped to the surface via an appropriate well.

When a formation such as oil shale is being treated wherein full use of the energy released underground is desired in distilling oil from the formation, the detanation serving to undercut the earlier detonated cylinder is placed appropriately close below the bottom of such cylinder to transfer heat from the bottom detonation to the previously broken cylinder thereabove.

For maximum economy, it is essential in this kind of process to use the largest possible nuclear explosives which can be detonated at the particular depth above which a mineral deposit is to be broken up without venting debris above ground and without causing damage to surface structures by excessive seismic shock. Here the present invention offers an important advantage by making use of the principle of seismic decoupling. Particle motion at the point on the earth's surface is a function of the shock received there. Shock from an underground energy source is received at a surface point in three ways: directly by the propagation of a shock wave radially from the source point; by reflection of the shock wave from a stratum located below the source point; and by propagation from the source point directly upward to an epicenter and then along the earth's surface.

The present invention makes use of seismic decoupling to attenuate a shock wave. A nuclear detonation set off near a cavity, tunnel or vertical shaft or column which only contains a compressible gas or pieces of broken rubble with compressible gas between the pieces will propagate principally in the direction of such a compressible zone or cavity, and the cavity created by the latter detonation will grow in the direction of any compressible zone which is sufficiently near. Thus, any associated void or partially void zone will attenuate a shock wave to the extent it is compressible.

In a typical operation embodying the present invention, a nuclear explosive device of appropriate yield, of either the fusion or fission type, is placed at an appropriate depth beneath the mineral zone to be "mined" and is detonated. A column filled with broken rock or rubble results and may at this stage be treated with an appropriate extraneous fluid if desired. For maximum effectiveness, another nuclear explosive device similar in size to the first one is emplaced and detonated at a point laterally spaced from the first column by a distance greater than five radii of the first column, e.g., ten radii apart, whereby a new, second column containing broken rock similar to the first column is produced. It is desired to space such columns a sufficient distance apart that the formation between them will remain unfractured or largely so. A hole is then drilled through the unfractured zone between the two columns to a depth greater than that at which the previously mentioned devices were detonated and an appropriately more powerful nuclear device is emplaced and detonated at this new depth. The point of placement of this last or bottom device should be such that the melted zone when the cavity created by its detonation is fully expanded will be below the bottom of the previously created column or columns if heat from the last detonation is not wanted in the subsequent treatment of the broken formation thereabove, or such that the melted zone will extend into the previously created column or columns and release large amounts of heat thereinto, if, for instance, the heat is wanted to assist in the distillation of hydrocarbons therefrom.

During the cavity expansion phase following the bottom detonation the propagating compressed zone will mainly grow toward and into the two columns of broken rock thereabove while the rock betwen the two columns will be further broken. Upon full expansion the material in the two columns will be crushed and pressurized as desired and if a liquid treating agent is injected into the columns prior to the bottom detonation the latter will force such liquid upwardly through the column or columns of broken rock thereabove and also into the fractured zone surrounding them. Upon collapse of the roof of the bottom cavity between the columns of broken rock, the rock from the columns will settle down toward and into the bottom cavity, thereby increasing the permeability of the detonated formation.

When a liquid solvent was injected into th broken formation to leach mineral values therefrom as described above, the resulting pragnant solution or other liquid product released in the formation then collects at the floor of the new rock filled column or irregularly shaped cavity and is forced to the surface by pumping or the like for further treatment or recovery.

The shock wave produced by the bottom detonation, which wave is radially propagated by cavity expansion, is in the present invention attenuated in its upward component by the compressible zone or zones previously created thereabove which muffle both the seismic wave that moves to the epicenter and the one that moves radially directly to the earth's surface. Because of such attenuation a larger, more economical device can be used at a given depth than would otherwise be permissible.

The present invention is applicable to the treatment of oil shale and the recovery of useful hydrocarbon products therefrom, as well as the treatment of other formations containing semi-solid or solid hydrocarbons such as tar sand, oil sand, bituminous limestone, kerogen rocks, peat coals, bituminous coals, and anthracite coal. After one or more nuclear detonations are set off under such a formation, the flowable hydrocarbons released therein or distilled therefrom by the heat accompanying such detonations may be recovered from the broken formation through recovery wells. If desired, the hot broken shale rock may be impregnated in situ by an aqueous catalyst solution or suspension prior to oil recovery therefrom to obtain at least partial further conversion of the oil while in contact with the nuclearly heated rock. For instance, a conventional sulfur-resistant hydrogenation catalyst, such as cobalt or molybdenum sulfide or a mixture comprising such sulfides, can be forced into the broken formation in the form of an aqueous suspension to impregnate the rock. This will provide catalytically active surfaces which, in the presence of the considerable quantities of free hydrogen inherently liberated by a nuclear detonation in a hydrocarbon bearing stratum (which hydrogen, if desired, may be supplemented by hydrogen gas pumped down from above ground), will promote in situ saturation of unsaturated hydrocarbon products as well as desulfurization and denitrification of hydrocarbon products being recovered.

As another possibility, a slurry of an appropriate conventional siliceous cracking catalyst such as a synthetic silica-alumina composite or natural or acid treated clay may be pumped, somewhat like drilling mud, into the hot regions of the nuclearly broken underground stratum so that hydrocarbon passsing upwardly over the thus impregnated permeable rock will be catalytically cracked in situ to form more desirable products as they are being recovered.

When the flow of the released hydrocarbons ceases or slows down to less than a desirable rate, a hot retorting fluid is desirably injected into the lower portions of the broken shale or similar formation, or such a fluid is generated in situ by blowing an oxygen containing gas such as air down to where it will burn the carbonaceous residue left behind when the more volatile components are distilled off, with the result that more complete recovery of distillable hydrocarbons from the broken formation is achieved. The basic technique employed in such underground retorting has been described and illustrated in considerable detail in my earlier copending applications, for instance, application Ser. No. 615,444, filed Feb. 13, 1967, as well as in issued patents, and no purpose would be served in repeating such information here.

The invention is likewise eminently applicable to the recovery of metal ores such as copper, silver, zinc, lead, iron, nickel and tin; and non-metallic minerals such as phosphate rock, potash, and sulfur. More particularly, for instance, when a soluble substance such as copper is to be recovered from an ore which contains either metallic copper or copper oxide in igneous rock, the present invention provides for very efficient in situ leaching by an appropriate acid or alkaline liquid extractant, such as aqueous sulfuric acid of moderate strength, e.g., acid containing 0.5 to 30%, preferably 2 to 10%, $H_2SO_4$ by weight. Such sulfuric acid is pumped into the chimney of broken copper ore in quantity sufficient to provide therein about 20 to 80 pounds $H_2SO_4$ per ton of ore to be treated when such ore contains between about 0.5 and 2% copper by weight. Recovery of copper from the formation by such leaching should be between about 40 and 85% or more, e.g., 70% somewhat depending on proportion and strength of acid used, permeability of the formation, concentration of copper therein, etc.

When the metal is in the ore as a sulfide, arenside, telluride or a sulfo-salt, it can be recovered from such a sulfide-type ore either by converting it by in situ oxidation to the oxide by blowing air underground and then extracting the oxide as described above; or a sulfide-type ore can be processed directly by in situ flotation employing a liquid flotation medium, as is otherwise well known. For instance, the flotation medium may be water to which an auxiliary chemical is added, e.g., a collector such as a xanthate, a dithiophosphate, a thiocarbonate or alpha-naphthylamine or a frothing agent such as cresylic acid, pine oil, a branch-chain alcohol, etc.

As disclosed, for instance, in earlier copending application Ser. No. 547,672, now U.S. Patent 3,404,919, to which reference may be had for further details, the nuclear explosives useable in this type of operation may range in yield from as little as 10 kiloton up to 2,000 or even 20,000 megaton, it being noted that the cost of such explosives is relatively independent of the energy yield. Consequently, the largest size device that can be employed at the given depth appropriate for a particular job is generally the most economical one. Minimum safe depth of underground placement of a nuclear explosive device or bomb can be calculated from the equation $D=450W^{1/3}$ wherein D is the depth of placement in feet and W is the potential energy yield of the device in kilotons. Of course, when the principle of seismic decoupling is made use of in accordance with this invention, a substantially larger or more powerful device can be placed and detonated at a given depth D without venting than this equation would indicate. Put differently, a decoupled device, i.e., a device exploded at depth D within or below a cavity of sufficient size or compressibility such that the shock wave from the detonation proceeding upward is largely attenuated before it reaches solid unbroken rock above the compressible zone, can be of considerably greater yield than the calculated yield W, e.g., its energy may equal 2W, 10W or more, the maximum safe size in any such case depending on the location, size, and nature of the attenuating compressible zone and the shock attenuation accomplished thereby.

The invention will next be described in terms of some representative working examples.

Example 1

An embodiment of the invention will now be described with reference to FIGURES 1 and 2 of the attached drawings, applying the invention to in situ treatment of an oil shale deposit such as the one located in Rio Blanco County, Colo., e.g., Section 24, Township 1 S., Range 98 W. The stratum of pay shale to be treated here is about 1700 feet thick with about 1200 feet of lean shale and country rock on top of it. FIGURE 1 shows a section through this shale deposit after two columns or chimneys of shale rubble 21a and 21b have been detonated side by side therein and a third detonation has been set off therebelow. Referring to FIGURE 1, the earth's surface is designated by numeral 1, the beginning of the lean shale is shown at 2, the approximate boundary between the lean shale and the top of the pay shale is shown at 3, the approximate bottom of the pay shale is shown at 4, and the bottom of the lower lean shale is shown at 5.

A 50 kiloton thermonuclear device was placed in the formation at location 8 at a depth of about 3100 feet through a well 6b which originally extended to this depth, was sealed off prior to detonation of device 8 and was destroyed by such detonation. After detonation and collapse of the roof of the initial nuclearly created cavity, device 8 created above the shot point a chimney approximately 650 feet high having a roof 13. It is estimated that the chimney will have a diameter of about 265 feet and contain about 2 million tons of rubble or crushed shale rock. Exact location of ultimate roof failure cannot be accurately predicted, but can be accurately determined after the shot by drilling into the cavity. If it is then found that insufficient pay shale was caved down by the nuclear detonation, additional caving may be produced by placing and detonating a further nuclear device above or by forcing liquid TNT into the fractures in the shale formation above and thus block caving an additional amount of pay shale. Another similar chimney 21b laterally spaced from chimney 21a, or a plurality of such chimneys, is then preferably formed for maximum efficiency as described above in connection with chimney 21a. However, it is possible to utilize the invention forming only a single chimney which is then undercut by a nuclear detonation at a greater depth, as illustrated and described, for instance, in connection with FIGURES 8 and 9 of my earlier copending application Ser. No. 547,672, now U.S. Patent 3,404,919.

The broken shale in such chimneys is next retorted in situ, for instance, by re-drilling wells 6 so that they communicate with the cavities 22a and 22b at the top of chimneys 21a and 21b and introducing an oxygen-containing gas such as air through such wells and igniting it underground. Distilled liquid product is pumped from the bottom of chimneys or underground retorts 21a and 21b via recovery wells 10a and 10b. The injected oxygen-containing gas burns the residual carbonaceous matter in the shale from which more volatile product has been distilled, the combustion front progressing downward, distilling additional product and driving it down toward the inlets of the recovery wells. See, for instance, U.S. Patent 3,342,257 for a more detailed description of such underground retorting. The ash remaining in the chimney after such retorting is at a high temperature, e.g., between about 400° and 650° C.

At this stage an access well 24 is drilled approximately half way between chimneys 21a and 21b to a point 25 at a depth substantially below the original placement of devices 8, e.g., to 3250 feet. A large thermonuclear device, e.g., a 100 kiloton unit is then emplaced at point 25 and detonated creating a cavity 26 which expands until it melts the previously fused and solidified zones forming the floor or bottom portions of chimneys 21a and 21b. Thereby, after roof failure of the lower cavity 26, ash and broken rock thereabove settles downward into this cavity and new permeability is created in the previously described zones of hot retorted ash, as well as in the formation above cavity 26 and between chimneys 21a and 21b.

The appearance of the formation at this stage, after detonation of device 25 and roof failure of cavity 26 is illustrated in FIGURE 2 which shows a new cavity 31 atop the mass of rubble which now comprises unretorted, fragmented shale 32, retorted ash 33 from initial chimneys 21a and 21b as well as some country rock 34 in a common, enlarged chimney. The resulting permeability and intermixing of hot ash and fragmented oil shale will permit circulation of hot gases and vapors or liquids throughout the entire mass causing within a period of about 60 to 90 days' substantial equalization of temperature within the zone of rubble or crushed and retorted shale.

To the extent that cavity 26 overlaps the hardened, previously melted rock resting at the bottom of the previously described nuclear chimney containing the retorted ash residue, this hard rock will be re-melted and run to the bottom of new cavity 26 and the released radioactivity thereof will be entrapped in this melted material.

As the roof of cavity 26 and the rock above it progressively collapses and broken rock falls into the cavity the hot compressed gases such as carbon dioxide and hydrogen collected in the cavity travel upward throughout the new permeable formation and by fluxing and refluxing transfer and distribute in the fragmented or broken shale the heat at about 800° C. from the melted rock and that at about 500° to 650° C. from the hot retorted ash. In this manner the average temperature of the entire mass in the enlarged chimney including the as yet undistilled broken shale 32 will be between about 250° and about 450° C. As condensable shale oil distills out of this heated mass it will travel upwardly into cavity 31 and is there taken to the surface as a vapor or as a condensate through wells 24 and 10a and 10b, as may be appropriate.

When production falls below a desired rate, high energy steam may be inserted through well 24 which steam will circulate through the mass of rubble moving upwardly, distilling out additional hydrocarbons which are recovered through wells 10a and 10b.

Example 2

An embodiment of the invention as applied to the recovery of copper from a formation which contains copper oxide will next be described with reference to FIGURE 3 of the drawings. The copper ore deposit to be treated is a stratum 1000 feet thick and has 2000 feet of country rock above it. This stratum contains pay copper in a concentration of about 1% in igneous gangue.

Referring to FIGURE 3, the country rock or overburden extends from the surface 303 downward to the beginning of the pay copper at 304, the bottom face of the pay copper being shown at 305.

At the beginning of the operation a 50 kiloton thermonuclear explosive is placed in the formation through well 310 at a depth of 3200 feet as shown at 311 to where well 310 originally extended. When the well is sealed and the device detonated, a chimney 301 approximately 650 feet high and having a roof 312 is created above the shot point. It is estimated that the chimney will have a diameter of about 265 feet and contain about 2 million tons of rubble. If it is found that additional copper ore need be caved down this may be produced by placing or detonating a further nuclear device above or by placing a conventional explosive such as TNT in the fractures of the shale formation above the detonation point.

Aqueous sulfuric acid having an $H_2SO_4$ content of about 5 weight per cent is then pumped into the chimney of broken copper ore through access wells 313 and 314 until a liquid acid level 315 is formed about one third of the way up in the chimney. Sufficient volume of acid of proper strength should be introduced into the chimney to allow for the ultimate consumption of about 40 pounds $H_2SO_4$ per ton of broken rock treated in the process. After the acid is introduced at the top of the chimney it will percolate down and take some copper oxide into solution which will accumulate as a body of liquid 322 in the lower part of the chimney.

At this stage a further nuclear explosive device, e.g., a 100 kiloton device, is placed through slanted access well 307 at a point 316 substantially vertically under the first detonation point. Its placement is such that the melted zone created thereby is sufficiently below the aqueous acid solution thereabove that neither it nor the copper ore is adversely affected by excessive heat. Accordingly, detonation point 316 may be at a depth of about 3650 feet below the earth surface. When the cavity containing vaporized rock expands at the end of the melting phase following the detonation the resulting shock wave will crush the formation radially outwardly from the point of detonation but a large part of this force will act upwardly on the copper rubble constituting a compressible zone. As the shock wave crushes the rubble in an upward direction and thus comminutes and compresses it, it will lift and force the sulfuric acid solution 322 upwardly through the broken copper ore thereabove and will extract more copper from the ore into solution. Substantially all of the broken copper ore in the chimney will be crushed, except for a small amount at the top in some cases. However, the upward compression effect of the shock wave will put the acid solution under pressure and thus substantially all of the broken copper ore will be reached and treated thereby. As the acid finally hits the roof of the chimney, a substantial amount of acid solution will also tend to be forced from the upper portion of the chimney into fractures and fissures running outward from it by this pressure thus bringing more additional copper into the solution. Then when the compression wave passes and the pressure in the chimney is released by collapse of the roof of cavity 306, the acid solution forced up by the compression wave will run back from the lateral fractures into the chimney and in the chimney to the bottom thereof together with the main body of solution which was forced up through the chimney but remained within it. As the solution thus percolates down again through the column of broken and crushed ore, which now has once more become more permeable due to its progressive settling into cavity 306 after the collapse of its roof, additional copper is extracted from the ore during this downward pass. When the pregnant solution accumulates at the bottom of the new cylinder, it may be removed from there to the surface, e.g., through well 307 after re-drilling it, and copper may be recovered therefrom by electrolysis or it may be otherwise utilized.

When copper has thus been extracted and recovered from this initial chimney 301 to the extent which is economically feasible or desired, a similar sequence of detonations at similar depths is performed at a lateral distance from chimney 301, forming a similar chimney 401 as illustrated in FIGURE 4. Chimney 401 is formed at such a lateral distance from chimney 301 that when fully formed the sides of adjacent chimneys closest to each other will be sufficiently far apart that little or no communication therebetween will be established, i.e., that chimney 401 can be efficiently treated in the same manner as described above in connection with the now exhausted chimney 301, without losing any treating agent to the latter.

After all copper and pregnant solution has been removed from chimney 401 to an economically feasible degree a new access well 410 is drilled down through the untreated copper ore between chimneys 301 and 401 in a manner analogous to that described in some detail earlier herein with reference to FIGURE 1. Thus, for instance, a still larger thermonuclear device 420, such as a 500 kiloton unit, is then emplaced at a depth greater than the floor of cylinders 301 and 401, such as at 4350 feet, and detonated to create a new large cavity 425 into which the newly broken virgin mass directly above it as well as treated rock from chimney 301 and 401 will settle. Further fresh treating acid may be introduced into the already treated and evacuated chimneys 301 and 401 so that upon detonation of device 420 a new leaching sequence will take place through the newly broken ore thereabove, similarly as described earlier herein when acid was introduced into the initial chimney 301 and device 316 thereafter detonated. After completion of this extraction sequence, pregnant solution can be recovered from the bottom of the chimney above cavity 425. See FIGURE 4.

In the same manner as chimneys 301 and 401 have been separately detonated and extracted, made into one by the deeper detonation 420 therebetween, and the new integrated chimney containing the virgin ore originally located between chimneys 301 and 401 is extracted, additional pairs of laterally spaced chimneys 501–601, 701–801 and 901–1001 may be detonated as schematically illustrated in FIGURE 4; more deeply placed and more powerful nuclear explosive devices 520, 620 and 720 may then be detonated under the respective pairs of chimneys at what may be called Tier No. 2 after the chimneys have been extracted, thereby again integrating each pair into an enlarged, integrated chimney containing additional virgin ore which is then extracted as before; still more deeply placed and more powerful nuclear explosive devices 430 and 830 may then be placed in a Tier 3 between and under the pairs of integrated chimneys 301–401/501–601 and 701–801/901–1001, thereby integrating the previously detonated areas and the undetonated areas therebetween into two new, more extensive super-chimneys for further extraction; a yet more deeply placed and yet more powerful device 640 may then be placed under the two super-chimneys to create a vast, new integrated chimney for further treatment of the broken mass therein; the whole scheme of operation being repeatable throughout the entire length and width of the ore deposit.

By operating in this manner, and by arranging the mutual spacing of the various detonations so as to make maximum use of the available energy, an exceptionally effective and economical "mining" process can be performed with a relatively small number of progressively more powerful nuclear explosive devices which become safety useable here because of the greater and more extensive muffling resulting from the escalated seismic decoupling effect inherent in this scheme.

Moreover, it should be understood that while this scheme has been described with particular reference to the mining of a metal ore depending primarily on in situ solvent extraction for product recovery, because of the tremendous quantities of heat available from the large nuclear devices the scheme should be even more applicable in cases where product recovery requires or can benefit from heat, as in the case of oil production from oil shale or from other deposits containing solid or excessively viscous hydrocarbons locked therein, or in the production of sulfur from elemental sulfur deposits, etc.

The invention described and exemplified above is more particularly pointed out and claimed in the appended claims.

I claim:
1. In a process for recovering mineral values from an underground mineral bearing stratum in a geological formation by detonation of a first nuclear explosive device therein, the location and yield of said device being such as to cause upon its detonation a breaking up of said stratum and its at least partial caving down into a first cavity created by such detonation, thereby forming a mass of rubble with a fluid therebetween contained underground in a substantially cylindrical column with a cavity at the top thereof while avoiding the venting of radioactive material into the atmosphere, the improvement which comprises drilling a hole to a depth greater than the bottom of the broken material caved into the aforesaid first cavity, placing a second nuclear explosive device in said hole at a depth greater than the bottom of the aforesaid first cavity, and detonating said second device and thereby creating a second cavity, the location and yield of said second device being such as to cause after its detonation and eventual collapse of said second cavity the caving of the broken material downward from the said first cavity toward the second cavity while avoiding the venting of radioactive products to the atmosphere, thereby increasing the permeability in said broken formation while using said first cavity to attenuate the shock wave from said second detonation by decoupling action, and recovering mineral values from the broken formation.

2. A process according to claim 1 wherein said hole in which said second nuclear explosive device is detonated is a substantially vertical hole laterally spaced from said first cavity.

3. A process according to claim 1 wherein said hole in which said second nuclear explosive device is detonated extends at a slant from a point on the surface which is laterally spaced from said first cavity to a point substantially vertically underneath said first cavity.

4. A process according to claim 1 wherein said mineral bearing stratum is a stratum which contains distillable hydrocarbons.

5. A process according to claim 1 wherein said mineral bearing stratum contains metal ore.

6. A process according to claim 1 wherein said mineral bearing stratum is an oil shale stratum and wherein a hot retorting fluid is passed through the broken oil shale and released hydrocarbon product is recovered therefrom.

7. A process according to claim 6 wherein said hot retorting fluid is passed through the oil shale formation after detonation of said first explosive device and before detonation of said second explosive device therein.

8. A process according to claim 1 wherein said mineral bearing stratum is an oil shale stratum and wherein a hot retorting gas is passed through the broken oil shale stratum and released hydrocarbon product is recovered therefrom after detonation of said second explosive device.

9. A process according to claim 1 in which the mineral bearing stratum comprises copper oxide in igneous rock and which process comprises:

(a) injecting aqueous sulfuric acid into the broken copper oxide-containing formation after said first detonation so as to form an aqueous acid pool in said first cavity before said second detonation, whereby said aqueous acid is forced from said pool upwardly through said broken formation by said second nuclear detonation which also serves to crush the broken formation and increase its permeability as its lower part drops into the cavity formed by said second detonation, and after being forced up through said broken and crushed formation said aqueous acid percolates back down therethrough dissolving copper therefrom, and collects as a pregnant copper solution in a lower part of said formation, and (b) lifting and recovering said pregnant copper solution.

10. A process according to claim 1 in which the mineral bearing stratum comprises a sulfide type metal ore and which process comprises:

(a) partially filling the column which contains said ore as a mass of rubble with gas therebetween and a gas filled space thereabove with an aqueous flotation medium so as to form an exposed liquid surface in said gas filled space of said column, (b) injecting a gas into a lower portion of the column containing the broken ore whereby the gas bubbles up through said column carrying grains of ore with it and forming ore-containing froth on said exposed liquid surface, and (c) removing and lifting said ore-containing froth for recovery above ground.

11. A process for treating a geological formation according to claim 1 wherein a tier comprising at least one pair of separate, laterally spaced underground columns of approximately equal depth and containing a mass of broken rubble is created by detonations of nuclear explosive devices each of which creates a cavity at a certain depth into which broken formation caves from above before a further nuclear explosive device is emplaced and detonated at a greater depth between said pair of spaced columns to form a further cavity, the explosive yield and location of said further device being such that broken rock from each column of said pair of columns caves into said further cavity and a new, larger column of broken rock is formed from the aforesaid pair of columns.

12. A process according to claim 11 wherein a first tier comprising a multiplicity of pairs of separate, laterally spaced underground columns of approximately equal depth and containing a mass of broken rubble is created and wherein a further nuclear explosive device is emplaced and detonated at a greater depth between each such pair of columns as recited in claim 15, thereby forming a new and deeper tier comprising a plurality of said larger columns of broken rock.

13. A process according to claim 1 wherein said mineral bearing stratum comprises oil shale and wherein the rubble of oil shale created by said first detonation is impregnated before detonation of said second explosive device with a solution of hydrogenation catalyst which catalyzes the conversion of the hydrocarbons in the formation into more useful products before they are removed from the formation.

14. A process according to claim 13 wherein said catalyst is a sulfur-resistant hydrogenation catalyst.

15. A process according to claim 13 wherein said catalyst is a hydrocracking catalyst.

16. A process according to claim 13 wherein said catalyst is a siliceous cracking catalyst.

References Cited

UNITED STATES PATENTS

| 3,113,620 | 12/1963 | Hemminger | 166—36 |
| 3,303,881 | 2/1967 | Dixon | 166—36 |
| 3,342,257 | 9/1967 | Jacobs et al. | 166—36 |

OTHER REFERENCES

Lombard, "Recovering Oil from Shale With Nuclear Explosives," Journal of Petroleum Technology, Vol. XVII, No. 8, August 1965 (pp. 877–882).

STEPHEN J. NOVOSAD, Primary Examiner

U.S. Cl. X.R.

166—303; 299—13